United States Patent
Malkiewicz

[15] 3,650,612
[45] Mar. 21, 1972

[54] STRIP MARKING ASSEMBLY

[72] Inventor: Matthew F. Malkiewicz, New Foundland, N.J.

[73] Assignee: Eastman Kodak Company, Rochester, N.Y.

[22] Filed: Oct. 1, 1969

[21] Appl. No.: 862,712

[52] U.S. Cl. ..............................353/44, 33/18 R, 352/130
[51] Int. Cl. .......................................................G03b 21/26
[58] Field of Search ........................352/130, 1; 353/120, 44; 346/77; 33/18 R, 20 R

[56] References Cited

UNITED STATES PATENTS

| | | | |
|---|---|---|---|
| 2,859,659 | 11/1958 | Fenske et al. | 33/20 UX |
| 3,324,762 | 6/1967 | Walter et al. | 353/120 X |
| 3,441,941 | 4/1969 | Bullwinkel et al. | 346/77 X |
| 3,492,728 | 2/1970 | Morse | 353/44 X |
| 2,239,532 | 4/1941 | McClay | 352/1 X |

*Primary Examiner*—S. Clement Swisher
*Assistant Examiner*—Joseph W. Roskos
*Attorney*—Robert W. Hampton and R. Lewis Gable

[57] ABSTRACT

Apparatus is disclosed for placing marks or indicia on strips of inscribable material such as photographic film. The apparatus includes a motor for providing rotational torque, a stylus with an offset portion for marking the strip, an assembly for converting the rotational torque of the motor into a rectilinear motion and for coupling the rectilinear motion to the stylus, and a bracket having a surface brought into engagement with the offset portion of the stylus to thereby bring the stylus into contact with the strip.

5 Claims, 6 Drawing Figures

Patented March 21, 1972

MATTHEW F. MALKIEWICZ
INVENTOR.

BY R. Lewis Gable

Robert W. Hampton

ATTORNEYS

MATTHEW F. MALKIEWICZ
INVENTOR.

BY
ATTORNEYS

MATTHEW F. MALKIEWICZ
INVENTOR.

BY
ATTORNEYS

3,650,612

STRIP MARKING ASSEMBLY

BACKGROUND OF THE INVENTION

1. Field of the Invention

This invention relates to apparatus for marking and in particular, to apparatus for and the method of marking image-bearing media such as microfilms.

2. Description of the Prior Art

The use of microfilm provides a well-known method of storing great quantities of information. Typically, a strip of photographic film is exposed with a series of images or frames containing the information to be stored. In this manner, great quantities of information can be stored on a strip of photographic film which is wound onto a reel or cartridge.

Microfilm has may applications where it is necessary or desirable to continuously update the stored information by inserting or deleting information. This could be accomplished by simply rephotographing all of the original documents onto a new strip of photographic film; however, this would defeat one of the main purposes, i.e., to eliminate the retention and storage of a great number of documents. Instead, it is more desirable to remove the outdated frames of information and to insert a new strip of film containing the new information.

Information from microfilm may be typically displayed upon a projection device known as a reader or viewer. A cartridge or a reel containing a wound strip of microfilm may be inserted into the reader and the strip unwound until the desired frame or portion of the strip has been found. It would be desirable to permit the observer to mark the frames or portions of a strip of microfilm that are to be deleted as they are being displayed upon the reader.

It is therefore an object of this invention to provide a projection device with a strip marking assembly which may be easily actuated to place a mark upon a selected portion of a strip of an information bearing medium.

It is a further object of this invention to provide a marking assembly capable of placing a mark of a selected length into a desired depth upon the strip.

SUMMARY OF THE INVENTION

These and other objects are accomplished in accordance with the teachings of this invention by providing a marking assembly to be used with a strip projection device for placing indicia or marks on selected frames or portions of the strip. In particular, the marking assembly includes a motor for providing a rotational torque, a stylus to be driven with a rectilinear movement, means for converting the rotational torque of the motor to a rectilinear motion and for applying the rectilinear motion to the stylus, and a bracket having a surface into which a recessed or offset portion of the stylus is received to thereby bring the stylus into contact with the strip. In one illustrative embodiment of this invention, the marking assembly may be used in conjunction with a projection device so that the observer may actuate the motor to thereby place a mark upon the portion of the strip being viewed. Further, suitable means are provided for adjusting the height and lateral position of the stylus with respect to the strip to thereby respectively control the length and depth of mark made upon the strip.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
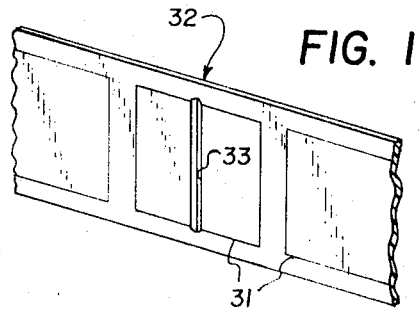
FIG. 1 is a frontal view of a portion of a strip marked by an assembly in accordance with the teachings of this invention.
Figure 2:
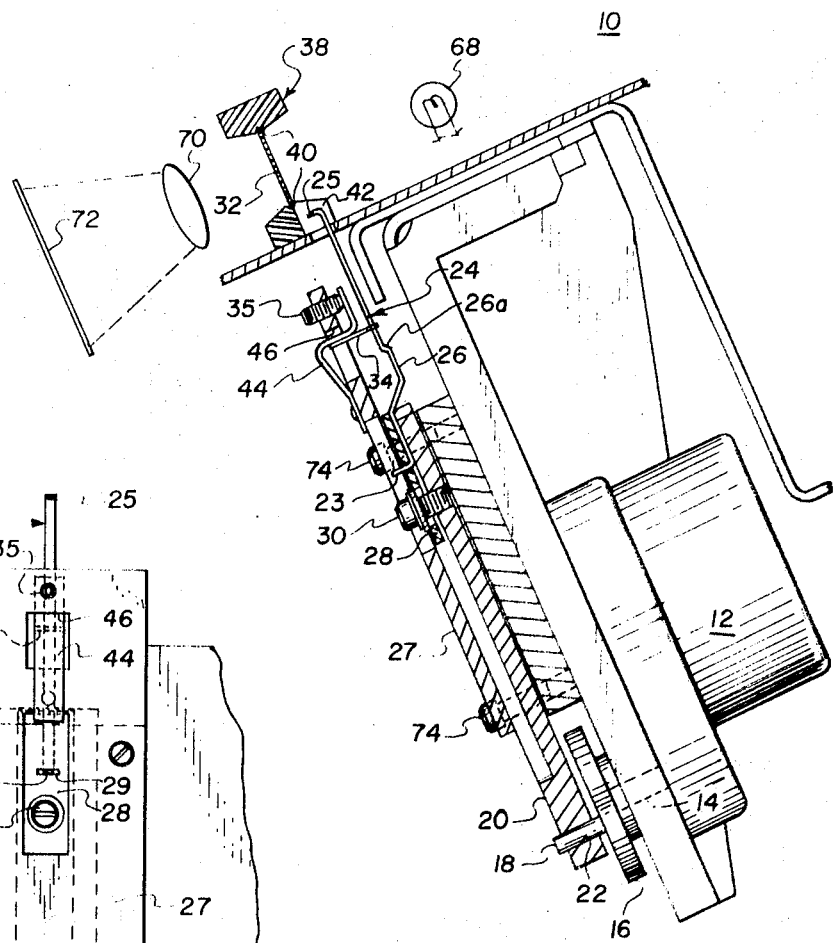
FIG. 2 is a side view, partially broken away, showing the marking assembly in accordance with the teachings of this invention.
Figure 6:
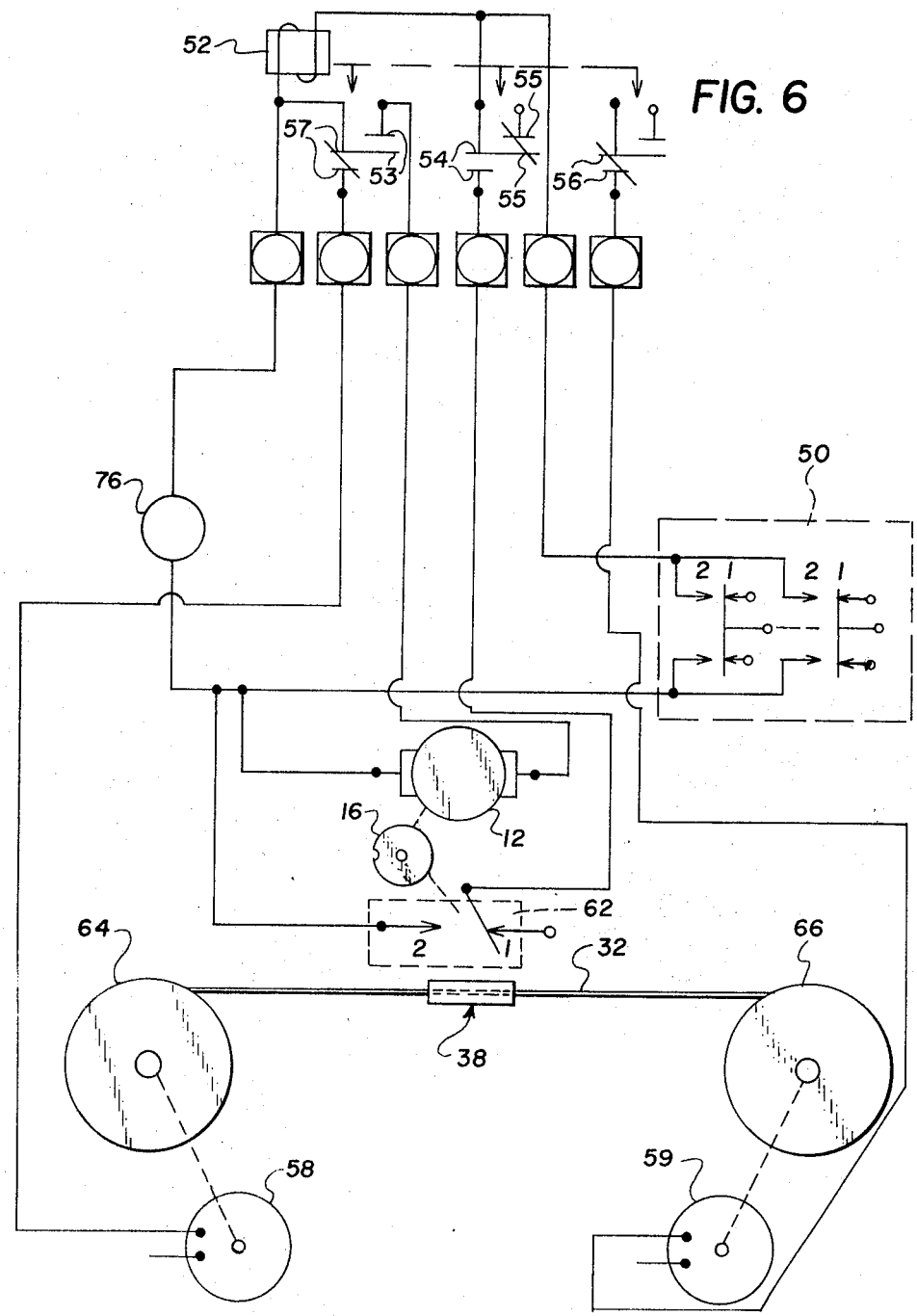
FIG. 6 shows a schematic diagram of a control circuit to control the operation of the marking assembly of FIGS. 2 and 3.

With regard to FIGS. 1 and 6, there is shown a strip 32 of an inscribable material, such as photographic film which is to be selectively inscribed with a mark 33. The strip 32 may be unwound from a supply reel 66, directed through a strip gate 38, and wound upon a takeup reel 64. The strip 32 has a plurality of frames 31 containing various information or indicia thereon. With reference to FIG. 2, the strip 32 is directed through the strip gate 38 until the desired frame 31 is found. The selected frame may be projected onto a display surface or screen 72 by a projection assembly including a projection lamp 68 and an objective or lens 70.

Figure 3:
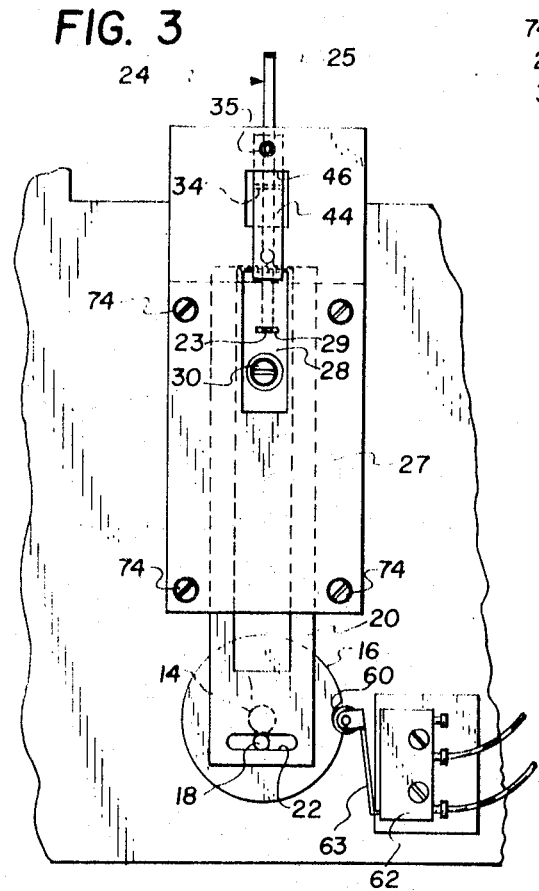
FIG. 3 is a top, plan view of the marking assembly shown in FIG. 2.

When it is desired to remove one of the frames from the strip 32, the mark 33 may be disposed on the frame to be removed by energizing a strip marking assembly 10. The strip marking assembly 10 includes a motor 12 for imparting a rotational motion or torque to a driven shaft 14. In turn, the driven shaft 14 is connected to an eccentric member 16 as shown in FIGS. 2 and 3 to impart a rotational motion thereto. The eccentric member 16 is connected by a rod 18 projecting therefrom into a movable plate 20. As more clearly shown in FIG. 3, the plate 20 has a slot 22 therein for receiving the rod 18. Four posts 74 form a path along which the plate 20 is driven in a rectilinear fashion as the eccentric member 16 is rotated. As shown in FIGS. 2 and 3, the plate 20 is confined by the posts 74, and also by a mounting plate 27.

Figure 4:
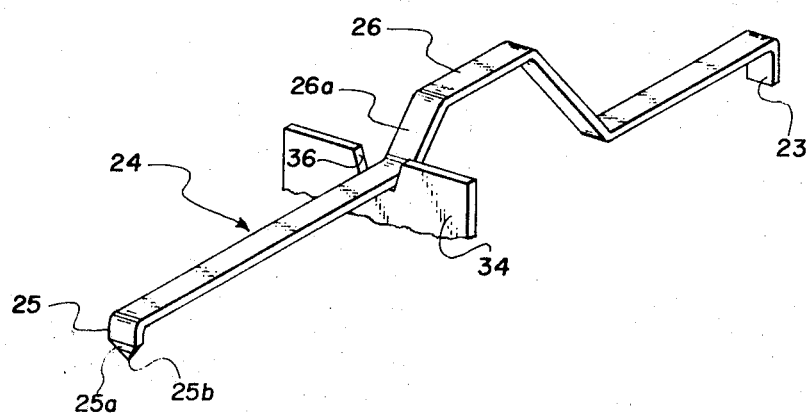
FIG. 4 is an orthogonal view of the marking stylus of the assembly of FIGS. 2 and 3.

A stylus 24 is mounted upon the plate 20 so that a point 25 of the stylus 24 may selectively engage the strip 32 to thereby place the mark 33 thereon. More specifically, a retaining plate 28 is secured to the plate 20 by suitable connecting means 30 such as a bolt and nut to thereby retain the stylus 24 between the plates 20 and 28. The retaining plate 28 has a slot 29 therein for receiving an end portion 23 of the stylus 24. As will be noted later, the end portion 23, and thus the stylus 24, may be laterally adjusted to thereby control the length of the mark 33 on the strip 32. As shown in FIGS. 2 and 4, the stylus 24 has a recessed or offset portion 26 which, when the stylus 24 is moved toward the strip 32, allows the point 25 to come into engagement with the strip 32. More specifically, the stylus 24 is mounted upon a plate 20 so as to be flexed or biased toward a bracket 34. The bracket 34 has a U-shaped groove 36 therein for receiving and for controlling the rectilinear motion imparted to the stylus 24 by the plate 20. As can be seen in FIGS. 2 and 4, when the stylus is moved toward the filmstrip 32, the recessed portion 26 will fall or be directed into the groove 36 thereby allowing the point 25 to come into contact with an emulsion 32a of the strip 32 of photographic film. As shown in FIG. 2, the position of the bracket 34, and therefore, the depth of the mark 33 imparted to the strip 32, may be selectively adjusted by a set screw 35 threadably received in the mounting plate 27. More specifically, the bracket 34 is secured to a spring mounting member 44, which is in turn fixedly located upon the mounting plate 27. The mounting plate 27 has an opening 46 therein through which the spring mounting member 44 extends. The member 44 is so constructed and mounted to flex to the left as shown in FIG. 2 thereby abutting against the adjustable screw 35. Thus, as the adjustable screw 35 is rotated, the position of the spring mounting member 44 and thus the bracket 44 may be selectively adjusted to thereby control the depth of the mark 33.

When the motor 12 is actuated, a rotational motion is applied to the eccentric member 16 and a rectilinear motion is applied to the plate 20 and the stylus 24. With regard to FIG. 2, the stylus 24 moves in a substantially vertical direction through a passage 42 in the strip gate 38 to thereby come into engagement with the strip 32. The strip 32 is disposed within a pair of grooves 40, which define the path along which the strip 32 moves. As the stylus 24 is moved upwardly, as shown in FIG. 2, the recessed portion 26 slides into the groove 36 of the bracket 34, thereby bringing the plate 25 into contact with the emulsion 32a of the strip 32. As the stylus 24 continues to be driven upwardly, the point 25 inscribes the mark 33 in the strip 32. Next, the stylus will be moved downward by the plate 20 until a cam surface 26a of the stylus 26 engages the bracket 34 thereby lifting the point 25 from the strip 32. The length of the mark 33 may be controlled by the point of connection of the stylus 24 to the plate 20. As seen in FIG. 2, the mounting plate 27 may be selectively secured to the plate 20 thereby adjustably connecting the stylus 24 with respect to plate 20. Thus, if the stylus 24 is mounted at a lower position on the plate 20, as seen in FIG. 2, a shorter mark 33 will be inscribed on the strip 32.

Figure 5:
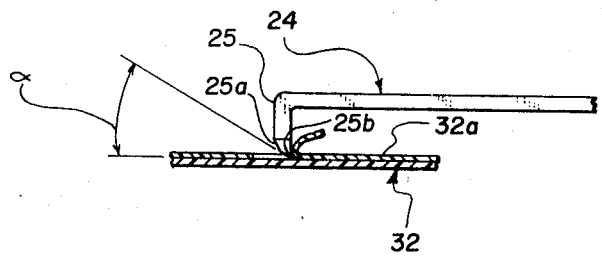
FIG. 5 is an enlarged side view of the marking stylus shown in FIG. 4.

With regard to FIG. 5, the point 25 of the scribe 24 has a shape designed to facilitate the cutting or scratching of the emulsion 32a of the strip 32. More specifically, the point 25 includes a chisel-like, cutting edge 25b and a rounded surface 25a sloping away from the edge 25b at an angle $\alpha$. The point is shaped and positioned to resemble a chisel so that it may readily be moved with little or no drag to the left and may be moved to the right as seen in FIG. 5 to cut the emulsion 32a. The angle $\alpha$ of the surface 25a with respect to the surface of the emulsion 32a is preferably set between 10° and 30° to minimize the amount of force perpendicular to the surface of the emulsion 32a required to make the cut. Further, the surface of the opening 36 may be coated with a suitable friction reducing material such as a plasma-sprayed ceramic.

Referring now to FIG. 6, there is shown an illustrative embodiment of a circuit for controlling the operation of the strip marking assembly 10. The operation of the strip marking assembly 10 begins with the closing of a redundant switch 50 from its first to its second position to thereby apply a suitable potential source 76 across a solenoid 52. The solenoid 52 is coupled to operate a plurality of contacts 53, 54, 55, 56 and 57. In particular, when solenoid 52 is energized, normally open contacts 53 are closed thereby applying a potential to the motor 12; as a result, motor 12 is energized and begins to rotate the eccentric member 16. As seen in FIGS. 3 and 6, the eccentric member 16 has a recess 60 for receiving a follower arm 63 of the switch 62. When the eccentric member 16 begins to rotate, the follower arm 63 is raised, thereby closing the switch 62, i.e., placing switch 62 in its second position. Further, when the solenoid 52 is initially energized, normally open contacts 54 are closed. As switch 62 is closed, a second conductive path is provided for the application of the voltage source 76 to the solenoid 52. As a result, when switch 50 is released, a potential will still be applied to activate solenoid 52. The motor 12 will continue to rotate through a full turn, thereby placing the mark 33 on the strip 32, until the follower arm 63 falls into the recess 60 to open switch 62. At this point, the source 76 will be disconnected from the solenoid 52 and the contacts 53 will return to their normal position thereby deenergizing the motor 12. In addition, a suitable potential (not shown) may be selectively applied through contacts 57 and 56 to the motors 59 and 58 which are mechanically coupled respectively to the reels 64 and 66. Thus, when the potential source 76 is applied to the solenoid 52, the normally closed contacts 56 and 57 are opened, thereby preventing the operation of the motors 58 and 59 and therefore the movement of a strip 32 while the stylus 24 is placing a mark 33 on the strip 32. When the potential is removed from the solenoid 52, the contacts 56 and 57 are closed thereby allowing a potential to be applied to the motors 58 and 59.

The invention has been described in detail with particular reference to a preferred embodiment thereof, but it will be understood that variations and modifications can be effected within the spirit and scope of the invention.

I claim:

1. In a device for projecting images carried by a strip of information bearing media, apparatus for placing marks on the media comprising:
   a. a projection station for receiving the strip of information bearing media;
   b. means for positioning a selected portion of the information bearing media at said projection station;
   c. stylus means for placing marks on the selected portion of the information bearing media disposed at said projection station, said stylus means being movable in rectilinear motion between a first position and a second position, said stylus means having a recessed portion;
   d. a bracket member having a contact surface, said stylus means being resiliently disposed against said contact surface so that as said stylus means is moved to said second position, said recessed portion is disposed against said contact surface to thereby place said stylus means against the information bearing media;
   e. a resilient member abutting said bracket, said resilient member engaging adjustment means for adjusting bias of said resilient member against said bracket, the bias of said resilient member positioning said bracket into engagement with said stylus means for controlling movement of said recessed portion into engagement with said bracket to thereby control the depth of the mark;
   f. a rotatable member;
   g. a motor coupled to said rotatable member for providing rotational motion of said member;
   h. linkage means coupling said stylus means and said rotatable member, said linkage means providing rectilinear motion of said stylus means between said first and second positions as said rotatable member rotates a preselected number of revolutions; and
   i. control means coupled to said rotatable member for deactivating said motor at the end of the preselected number of revolutions.

2. Apparatus for placing marks on information bearing media, said apparatus comprising:
   a. rotatable motor means;
   b. stylus means for placing marks on information bearing media, said stylus means having a recessed portion, and being movable in a rectilinear motion between a first position and a second position;
   c. a guide member having a contact surface, said stylus means being resiliently disposed against said contact surface so that as said stylus means is moved to said second position said recessed portion is disposed against said contact surface to thereby place said point against the information bearing media;
   d. a translational member for supporting said stylus means and responsive to rotation of said motor means to effect rectilinear movement of said stylus means;
   e. means for confining said movement of said translational member to a linear path;
   f. an eccentric member connected to said motor means for rotation about an axis, in response to rotation of said motor means;
   g. an elongated member connected to said eccentric member at a point remote from said axis; and
   h. means for coupling said translational member to said elongated member to thereby direct said translational member along said linear path in a rectilinear fashion.

3. Apparatus for placing marks on information bearing media, said apparatus comprising:
   a. rotatable motor means;
   b. stylus means for placing marks on information bearing media, said stylus means having a recessed portion and being movable in a rectilinear motion between a first position and a second position;
   c. a guide member having a contact surface, said stylus means being resiliently disposed against the contact surface so that as said stylus means is moved to said second position said recessed portion is disposed against said contact surface to thereby place said point against the information bearing media;
d. a translational member for supporting said stylus means, said stylus means being adjustably mounted thereto for varying the length of the mark, said translational member being responsive to said rotation of said motor means to effect rectilinear movement of said stylus means;
e. means for confining said movement of the translational member to a linear path;
f. an eccentric member connected to said motor means for rotation about an axis, in response to rotation of said motor means;
g. an elongated member connected to said eccentric member at a point remote from said axis; and
h. means for coupling said translational member to said elongated member to thereby direct said translational member along said linear path in a rectilinear fashion.

4. Apparatus for placing marks on information bearing media, said apparatus comprising:
a. rotatable motor means;
b. stylus means for placing marks on information bearing media, said stylus means having a recessed portion and being movable in a rectilinear motion between a first position and a second position;
c. a guide member having a contact surface, said stylus means being resiliently disposed against said contact surface so that as said stylus means is moved to said second position said recess portion is disposed against said contact surface to thereby place said point against the information bearing media, and said guide member is adjustably disposed with respect to said stylus to thereby control the depth of the mark on the information bearing media;
d. a translational member supporting said stylus means, said stylus means being adjustably mounted thereto for varying the length of the mark, said translational member being responsive to the rotation of said motor means to effect rectilinear movement of said stylus means;
e. means for confining said movement of said translational member to a linear path;
f. an eccentric member rotatably connected to said motor means for rotation about an axis, in response to rotation of said motor means;
g. an elongated member connected to said eccentric member at a point remote from said axis; and
h. means for coupling said translational member to said elongated member to thereby direct said translational member along said linear path in a rectilinear fashion.

5. Apparatus for placing marks on information bearing media, said apparatus comprising:
a. rotational motor means;
b. stylus means for placing marks on information bearing media, said stylus means having a recessed portion and being movable in a rectilinear motion between a first position and a second position;
c. a guide member having a contact surface, said stylus means being resiliently disposed against the contact surface so that as said stylus means is moved to said second position said recessed portion is disposed against said contact surface to thereby place said point against the information bearing media;
d. a translational member for supporting said stylus means, said translational member responsive to said rotation of said motor means for effecting rectilinear movement of said stylus means;
e. means for confining said movement of the translational member to a linear path;
f. an eccentric member rotatably connected to said motor means for rotation about an axis in response to rotation of said motor means;
g. an elongated member connected to said eccentric member at a point remote from said axis;
h. means for coupling said translation member to said elongated member to thereby direct said translational member along said linear path in a rectilinear fashion; and
i. switch means responsive to rotation of said eccentric member for deactivating said motor after one revolution thereof.

* * * * *